(No Model.)
L. Y. MYERS.
POST HOLE DIGGER.
No. 341,160. Patented May 4, 1886.
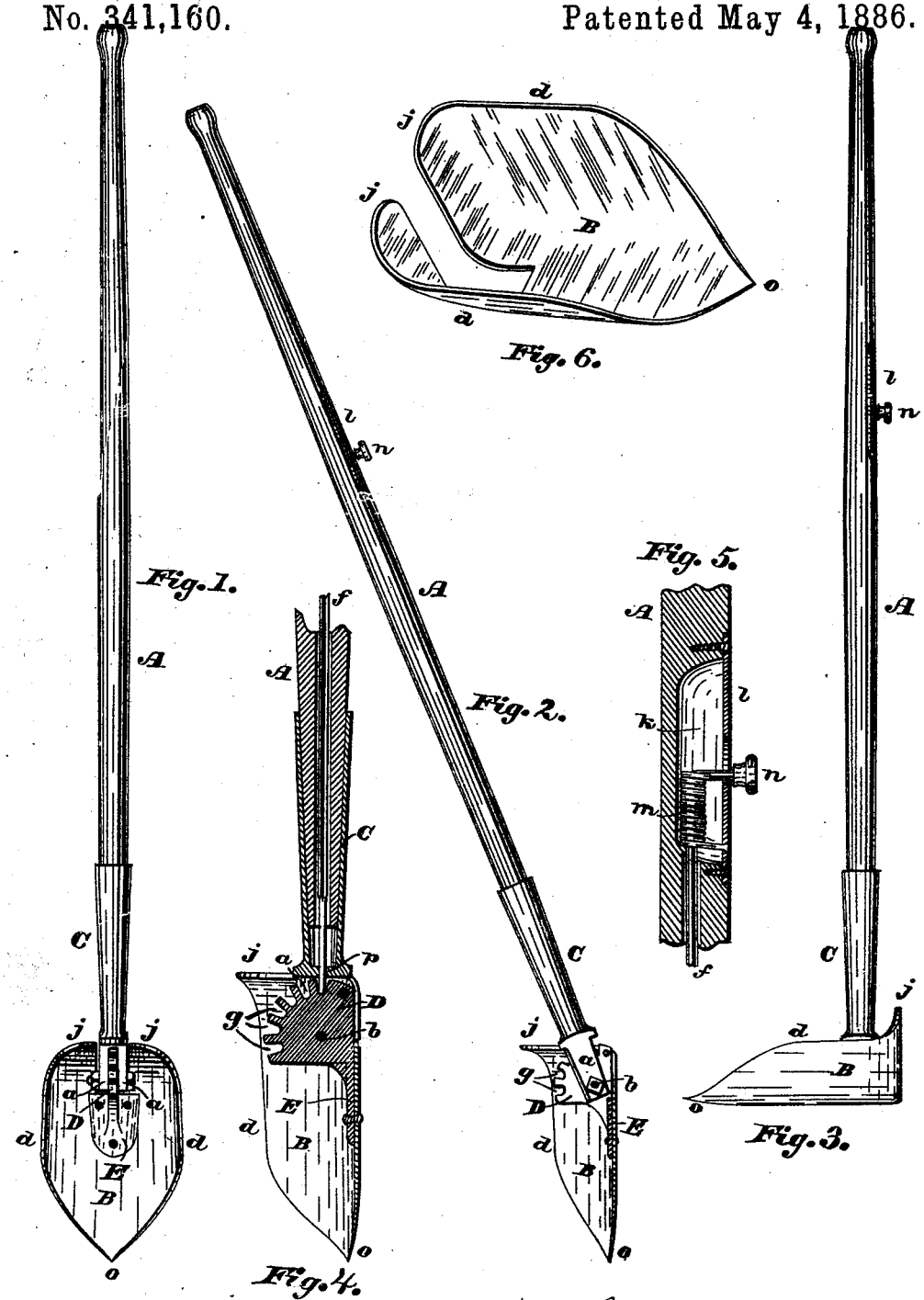
WITNESSES
Harry Frease
Chas. R. Miller
Lewis Y. Myers INVENTOR
By W. K. Miller Attorney

UNITED STATES PATENT OFFICE.

LEWIS Y. MYERS, OF CANTON, OHIO.

POST-HOLE DIGGER.

SPECIFICATION forming part of Letters Patent No. 341,160, dated May 4, 1886.

Application filed October 1, 1885. Serial No. 178,710. (No model.)

*To all whom it may concern:*

Be it known that I, LEWIS Y. MYERS, a citizen of the United States, and a resident of Canton, county of Stark, State of Ohio, have invented a new and useful Improvement in Post-Hole Diggers, of which the following is a full, clear, and exact description, reference being had to the accompanying drawings, making part of this specification.

My invention relates to improvements in post-hole diggers, and especially relates to that class of diggers consisting of a single swinging or hinged shovel and means for operating the same.

My invention also relates to and consists in providing such means and combination of parts as to form an implement that may be used either as a digger or shovel, as the case may require.

Figure 1 is a front elevation of my improved post-hole digger; Fig. 2, a side elevation, showing the handle thrown forward, and sectional view of the shovel. Fig. 3 is a side elevation showing the shovel in a position at right angles with the handle. Fig. 4 is a sectional view of the shovel and lower section of handle-socket, handle, sector, and locking-bolt. Fig. 5 is a sectional view of a section of the handle, showing the recess in the handle, provided to receive the spring by which the locking-bolt is actuated. Fig. 6 is a view of the side and bottom or back of the shovel B.

Letter A, Fig. 1, represents the handle situated centrally over the shovel B, and terminating in a conical annular socket, C, bifurcated at its lower end. The prongs $a$ $a$ embrace and have a pivotal connection, $b$, with the sector D, which is mounted on and integral with a plate, E, riveted to the front side of the shovel B, which may be made of a single piece of plate-steel, and formed as shown in Fig. 6. The sides $d$ $d$ of the shovel are turned up, forming a concavo-convex body, with the point $o$ rounded slightly from a vertical line, as shown in Fig. 4, and the wings $j$ $j$ turned in, so as to partly close the upper end of the shovel. The wings $j$ $j$ are formed by cutting away the middle section of the shovel-plate to adapt it to the use of the sector D and handle A. The handle A is perforated longitudinally, and adapted to receive the locking-bolt $f$, the lower end of which is adapted to the perforation $p$, through the end of the handle-socket C, between the prongs $a$ $a$, and to the notches $g$ in the periphery of the sector. The upper end of the locking-bolt rests in the recess $k$, (shown in Fig. 5.) This recess $k$ is covered by a plate, $l$, through which there is a slot, through which the upper end of the bolt projects, and to which any of the well-known forms of buttons or handles $n$ may be applied for the purpose of drawing the lower end of the bolt out of the notches $g$ in the sector. About the upper end of the bolt there may be provided a spring to actuate the bolt in one direction, and to hold the bolt in the sector, when, and as required, locking the shovel B to the handle A in rigid connection vertically, or in any intermediate degree between a vertical and horizontal. In this instance I have used a coil-spring of brass wire, the upper end of which is connected with the bolt, the lower end to a perforated seat projected from the plate $l$, and holds the bolt in position by its contracting power. I do not wish to be limited to any particular form or application of spring, as there are many well-known forms in which a spring may be applied to operate a locking-bolt; neither would I wish to be limited to the use of a spring, for in this case the spring might be omitted. The weight of the bolt would cause it to drop into the locking-notches of the sector, but because of the violent movement of the implement in the process of post-hole digging I prefer to use the spring. Neither do I wish to be limited to the form of shovel shown by letter B, Fig. 6, as it may be desirable to use other forms, as in some localities, where the soil is very sandy, a broad, flat, straight-edged shovel might be more desirable than the pointed concavo-convex shovel. The edge of the sector may be cut away at the bottom of notches $g$, leaving a sharp ridge central to the notch, that whatever of dirt or earth may lodge in the notch may be easily displaced by the locking-bolt.

The prongs $a$ $a$ of the handle-socket C having been placed over and embracing the sector D, the bolt $b$ may be passed into the perforations provided in the ends of the prongs, and the center of the sector, and by turning on the threaded nut the parts may be held firmly and securely together.

In digging post-holes the digger may be used first as an ordinary spade or shovel by resting the foot on the wings $j$ and forcing the shovel into the ground, and remove the earth as with a shovel, then by striking the shovel around in form of a circle until a core of earth has been loosened, strike the digger down its full length, move the handle over, as shown in Fig. 2, then press down on the handle A and draw it back to a vertical position. Repeat this movement of the handle until the shovel has reached a position across the hole and at right angles with the handle when in a vertical position, when it may be raised from the hole with its burden of earth, and when in the act of swinging the shovel from the hole raise the button $n$, the earth will be discharged from the shovel and the shovel drop back into position for entering the hole as a digger.

The simplicity, strength, and durability of this form of digger are apparent, and the removal of all outside rods and levers reduces the weight of the implement and makes it more desirable to handle.

I am aware that shovels have been hinged to handles and for the purpose of a post-hole digger that were controlled in their relations to the handle by reciprocating rods both inside and outside of the handle, and actuated by and held in position by a hand-lever.

I do not broadly claim hinging a digging-shovel to a handle, but the hereinbefore-described method of hinging and the construction in detail and combination of parts, as set forth.

What I claim, and desire to secure by Letters Patent, is—

1. The combination, with a shovel, a sector rigidly secured to the front face thereof, and a handle pivotally secured to the sector, of a locking-bolt located within the handle and adapted to engage the sector, substantially as set forth.

2. The combination, with a shovel having the opening in the upper or inner end thereof, and a sector rigidly secured to said shovel, of a handle pivotally secured to the sector and adapted to rest and move within the opening in the inner end of the shovel, and a bolt for locking the handle against movement, substantially as set forth.

3. The combination, with a shovel, substantially as described, having an opening in the upper end thereof, of the plate E, secured to the shovel, the sector secured to the plate, a handle pivoted to the sector, and a bolt for locking the handle to the sector, substantially as set forth.

4. The combination, with a shovel and a sector rigidly secured thereto, of the ferrule pivoted to the sector, the handle secured to the ferrule, the bolt located within the handle and ferrule, and the spring secured to the bolt for moving the same in one direction, all of the above parts combined and operating substantially as set forth.

In testimony whereof I have hereunto set my hand this 29th day of September, A. D. 1885.

LEWIS Y. MYERS.

Witnesses:
W. K. MILLER,
CHAS. R. MILLER.